(12) United States Patent
Agarwal et al.

(10) Patent No.: US 7,818,725 B1
(45) Date of Patent: Oct. 19, 2010

(54) MAPPING COMMUNICATION IN A PARALLEL PROCESSING ENVIRONMENT

(75) Inventors: Anant Agarwal, Weston, MA (US); Patrick Robert Griffin, Framingham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1185 days.

(21) Appl. No.: 11/414,473

(22) Filed: Apr. 28, 2006

Related U.S. Application Data

(60) Provisional application No. 60/675,804, filed on Apr. 28, 2005.

(51) Int. Cl.
G06F 9/45 (2006.01)
(52) U.S. Cl. ...................................................... 717/136
(58) Field of Classification Search .................. 717/136
See application file for complete search history.

(56) References Cited

U.S. PATENT DOCUMENTS

| | | | |
|---|---|---|---|
| 7,028,281 B1 * | 4/2006 | Agrawal et al. ............... | 716/12 |
| 7,394,288 B1 | 7/2008 | Agarwal | |
| 7,461,236 B1 | 12/2008 | Wentzlaff | |
| 2004/0060032 A1 * | 3/2004 | McCubbrey .................. | 716/16 |
| 2004/0105384 A1 | 6/2004 | Gallezot et al. | |
| 2004/0250046 A1 | 12/2004 | Gonzalez et al. | |
| 2004/0268286 A1 | 12/2004 | New et al. | |
| 2006/0179429 A1 | 8/2006 | Eggers et al. | |
| 2006/0206850 A1 * | 9/2006 | McCubbrey .................. | 716/17 |

FOREIGN PATENT DOCUMENTS

WO WO 2004/072796 A2 8/2004

OTHER PUBLICATIONS

Weng et al., Profiling and mapping of parallel workloads on network processors, ACM, p. 890-896.*
"Pipe." The Single UNIX® Specification, Version 2, Copyright © 1997, The Open Group, pp. 1-2. Downloaded Nov. 29, 2006 from http://www.opengroup.org/onlinepubs/007908799/xsh/pipe.html.
Agarwal, Anant et al. "Mapping Communication in a Parallel Processing Environment", U.S. Appl. No. 11/414,473, filed Apr. 28, 2006.
Wentzlaff, David. "Buffering Data in a Parallel Processing Environment", U.S. Appl. No. 11/313,900, filed Dec. 21, 2005.
USPTO Non-final Office Action issued in U.S. Appl. No. 12/130,462, mailed Mar. 3, 2009, 8 pages.
USPTO Non-final Office Action issued in U.S. Appl. No. 11/404,187, mailed Feb. 5, 2009, 15 pages.

(Continued)

*Primary Examiner*—John Chavis
(74) *Attorney, Agent, or Firm*—Fish & Richardson P.C.

(57) ABSTRACT

An the integrated circuit comprises a plurality of processor cores interconnected by an interconnection network. A method for generating instructions to be executed in the integrated circuit comprises accepting a plurality of programs, at least some of the programs including one or more communication operations to communicate with other programs; mapping each program to one or more of the processor cores; determining correspondence among communication operations in the programs; and mapping communication for corresponding communication operations to resources associated with the interconnection network.

27 Claims, 6 Drawing Sheets

OTHER PUBLICATIONS

USPTO Non-final Office Action issued in U.S. Appl. No. 11/404,207, mailed Nov. 13, 2008, 9 pages.

USPTO Non-final Office Action issued in U.S. Appl. No. 11/404,655, mailed Mar. 23, 2009, 14 pages.

Agarwal, Anant. "Raw Computation," *Scientific American* vol. 281, No. 2: 44-47, Aug. 1999.

Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35th International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Performance Analysis of PIM, Stream Processing , and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua, Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.Ics.mit.edu/pub/raw/documents/RawSpec99.pdf>.

Moritz, Csaba Andras et. al., "Hot Pages: Software Caching for Raw Microprocessors," *MIT/LCS Technical Memo LCS-TM-599*, Aug. 1999.

Gordon, M. I. et al., "A Stream Compiler for Communication-Exposed Architectures." MIT Laboratory for Computer Science, Cambridge, MA, 2002.

Agarwal, A. et al., "The MIT Alewife Machine: Architecture and Performance." Massachusetts Institute of Technology. Cambridge, MA, 1995.

Rau, B. Ramakrishna, "Iterative Modulo Scheduling: An Algorithm for Software Pipelining Loops." Hewlett-Packard Laboratories, 1994.

Gropp, William et al., "A High-Performance, Portable Implementation of the MPI Message Passing Interface Standard." Mathematics and Computer Science Division, Argonne National Laboratory. Available from http://www-unix.mcs.anl.gov/mpi/mpichl/papers/mpichimpl.pdf before 2006).

* cited by examiner

MAPPING COMMUNICATION IN A PARALLEL PROCESSING ENVIRONMENT

CROSS-REFERENCE TO RELATED APPLICATIONS

This application claims the benefit of U.S. Provisional Application No. 60/675,804, filed Apr. 28, 2005, entitled "C-FLOW-MAPPING C PROCESSES USING PIPES ONTO RAW," incorporated herein by reference.

This application is related to U.S. Provisional Application Ser. No. 60/796,300 titled "MAPPING COMMUNICATION IN A PARALLEL PROCESSING ENVIRONMENT," which is being filed concurrently with the present application, and which is also incorporated herein by reference.

STATEMENT AS TO FEDERALLY SPONSORED RESEARCH

The invention was made with government support under Grant Number NBCH1040009 awarded by DARPA. The government has certain rights in the invention.

BACKGROUND

The invention relates to programming for integrated circuits, and more particularly to mapping communication in a parallel processing environment.

FPGAs (Field Programmable Gate Arrays) and ASICs (Application Specific Integrated Circuits) are two exemplary approaches for implementing customized logic circuits. An ASIC is designed for a specific application. The cost of building an ASIC includes the cost of verification, the cost of physical design and timing closure, and the NRE (non-recurring costs) of creating mask sets and fabricating the ICs. Due to the increasing costs of building an ASIC, FPGAs became increasingly popular in the late 1990's. Unlike an ASIC, an FPGA is reprogrammable in that it can be reconfigured for each application. Similarly, as protocols change, an FPGA design can be changed even after the design has been shipped to customers, much like software can be updated. However, FPGAs are typically more expensive, often costing 10 to 100 times more than an ASIC. FPGAs are typically power hungry and their performance can be 10 to 20 times worse than that of an ASIC.

The MIT Raw integrated circuit design provides reconfigurability of an FPGA along with the performance and capability of an ASIC. The MIT Raw design is an example of a tiled integrated circuit providing a computational substrate as described, for example, in "Baring It All to Software: RAW Machines" IEEE Computer, September 1997, pp. 86-93, incorporated herein by reference. Techniques for compiling instructions and scheduling communication in Raw integrated circuits are described, for example, in "Space-Time Scheduling of Instruction-Level Parallelism on a Raw Machine," Proceedings of the Eighth International Conference on Architectural Support for Programming Languages and Operating Systems (ASPLOS-VIII), San Jose, Calif., Oct. 4-7, 1998, incorporated herein by reference.

SUMMARY

In one aspect, in general, the invention features a method for generating instructions to be executed in an integrated circuit, the integrated circuit comprising a plurality of processor cores interconnected by an interconnection network. The method comprises accepting a plurality of programs, at least some of the programs including one or more communication operations to communicate with other programs; mapping each program to one or more of the processor cores; determining correspondence among communication operations in the programs; and mapping communication for corresponding communication operations to resources associated with the interconnection network.

In another aspect, in general, the invention features a computer program, stored on a computer-readable medium, for generating instructions to be executed in an integrated circuit comprising a plurality of processor cores interconnected by an interconnection network. The computer program comprises instructions for causing a computer system to: accept a plurality of programs, at least some of the programs including one or more communication operations to communicate with other programs; map each program to one or more of the processor cores; determine correspondence among communication operations in the programs; and map communication for corresponding communication operations to resources associated with the interconnection network.

Aspects the invention can include one or more of the following features.

Determining correspondence among communication operations in the programs comprises matching pairs of send and receive operations within the programs.

Matching pairs of send and receive operations within the programs comprises determining whether a pair of send and receive operations are included in portions of the programs that have corresponding control flow.

Determining whether a pair of send and receive operations are included in portions of the programs that have corresponding control flow comprises determining a number of loop iterations in the portions of the programs.

Determining whether a pair of send and receive operations are included in portions of the programs that have corresponding control flow comprises determining a loop nesting level of the operations in the portions of the programs.

Mapping communication for corresponding communication operations to resources associated with the interconnection network comprises mapping communication between at least one pair of programs that include matching send and receive operations to a route through the network between processor cores mapped to the respective programs.

Mapping the communication to the route comprises generating sequences of switch instructions specifying connections between input and output ports of switches in processor cores along the route.

Each switch instruction comprises a control flow portion and a routing portion.

The control flow portion of each switch instruction is based on control flow for computations performed in the pair of programs.

The routing portion of each switch instruction specifies input ports to be connected to at least some of the output ports.

The control flow portion comprises a branch instruction, a jump instruction, or a no-op instruction.

Mapping the communication to the route comprises generating destination information for message data associated with the matching send and receive operations, whereby switches in processor cores are able to use the destination information to direct the message along the route.

Mapping communication for corresponding communication operations to resources associated with the interconnection network comprises providing shared memory accessible to at least one pair of programs that include matching send and receive operations for storing message data associated with the send and receive operations.

Each send operation specifies data to be sent and a receiver endpoint, and each receive operation specifies a sender endpoint.

The receiver endpoint or sender endpoint identifies a tile processor core.

The receiver endpoint or sender endpoint identifies a port of the switch in the identified processor core that provides an interface external to the plurality of processor cores.

The method further comprises revising each program to perform a specified computation on the mapped one or more processor cores using the mapped resources.

The method further comprises mapping at least one of the programs to multiple processor cores.

The method further comprises compiling the mapped program to run in parallel on the multiple processor cores.

Compiling the mapped program comprises compiling the mapped program to run in the multiple processor cores based on instruction level parallelism.

Each program is written in a high-level programming language.

Each program comprises code generated by compiling source code written in the high-level programming language.

The high-level programming language uses C programming language syntax.

Aspects of the invention can have one or more of the following advantages.

A compiler automatically generates static network instructions for communicating between tiles. The compiler allows the programmer to write a simple high-level language program (e.g., a C program) for each tile, specifying any data that should be sent to or received from other tiles. The compiler router then generates the necessary routing code, attaining performance on the order of that generated by hand-coded assembly while avoiding the arduous programming process.

The compiler allows the programmer to take advantage of various static network characteristics without having to explicitly program the individual switch processors in low-level assembly code. For example, since static networks do not require header words to be transmitted along with the message data, network bandwidth does not need to be used for transmitting routing information. Because the routing information is specified in the switch instruction streams, the switch processors can prepare routing operations before the message data actually arrives, allowing for lower message transmission latency. Additionally, a single data word can be sent to multiple ports, using a simple mechanism for sending broadcast-type messages. The static network enables a single tile to broadcast to an arbitrary set of recipient tiles with only a single send operation. Compared to dynamic networks, static networks often provide better bandwidth to utilization, lower latency, and an easier mechanism for sending messages to multiple recipients.

The compiler provides the flexibility of hand-coding without the necessity of hand-written switch assembly code. A programmer is able to write a high-level language tile program for each tile. The switch instructions necessary for communication between these tile programs is automatically generated by the compiler. By generating switch instructions automatically, the compiler simplifies the process of writing large programs that have been manually partitioned into multiple tile programs. Thus, the compiler allows the programmer to write larger programs more quickly, while maintaining performance similar to that of a program with hand-coded switch instructions.

Other features and advantages of the invention will become apparent from the following description, and from the claims.

DESCRIPTION

1 Tiled Circuit Architecture Overview

Figure 1:
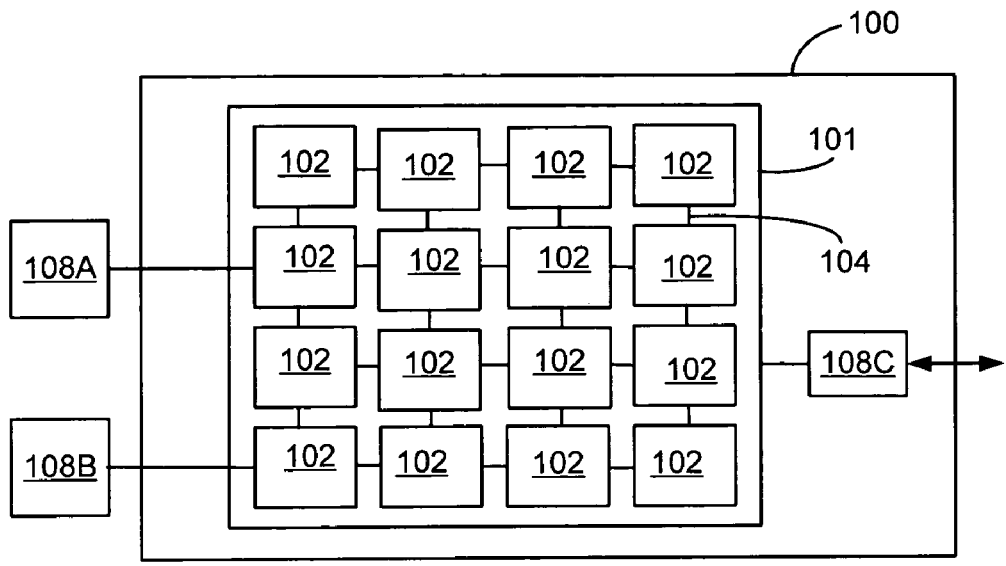
FIG. 1 is a block diagram of a tiled integrated circuit.

Referring to FIG. 1, an integrated circuit 100 (or "chip") includes an array 101 of interconnected tiles 102. Each of the tiles 102 includes a processor (or "processor core") and a switch that forwards data from other tiles to the processor and to switches of other tiles over data paths 104. In each tile, the switch is coupled to the processor so that data can be sent to or received from processors of other tiles. The integrated circuit 100 includes other on-chip circuitry such as input/output (I/O) interface circuitry to couple data in and out of the circuit 100, and clock distribution circuitry to provide clock signals to the processors of the tiles.

The example of the integrated circuit 100 shown in FIG. 1 includes a two-dimensional array 101 of rectangular tiles with data paths 104 between neighboring tiles to form a mesh network. The data path 104 between any two tiles can include multiple "wires" (e.g., serial, parallel or fixed serial and parallel signal paths on the integrated circuit 100) to support parallel channels in each direction. Optionally, specific subsets of wires between the tiles can be dedicated to different mesh networks that can operate independently. In some examples, the network includes paths that extend to diagonal neighbors or to tiles that are multiple rows or columns away. Other examples include higher dimensional mesh topologies. For example, multiple layered integrated circuits or other three-dimensional configurations can be used to form networks in which the connections form a cube of network nodes.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented, for example, off-chip or in logic blocks within a tile or on the periphery of the integrated circuit 100.

The following exemplary implementations are described in the context of tiles that each have the same structure and functionality. Alternatively there can be multiple "tile types" each having different structure and/or functionality. For example, tiles that couple data off of the integrated circuit 100 can include additional circuitry for I/O functions. Tiles are not necessarily arranged in a regular rectilinear array.

Figure 2A:
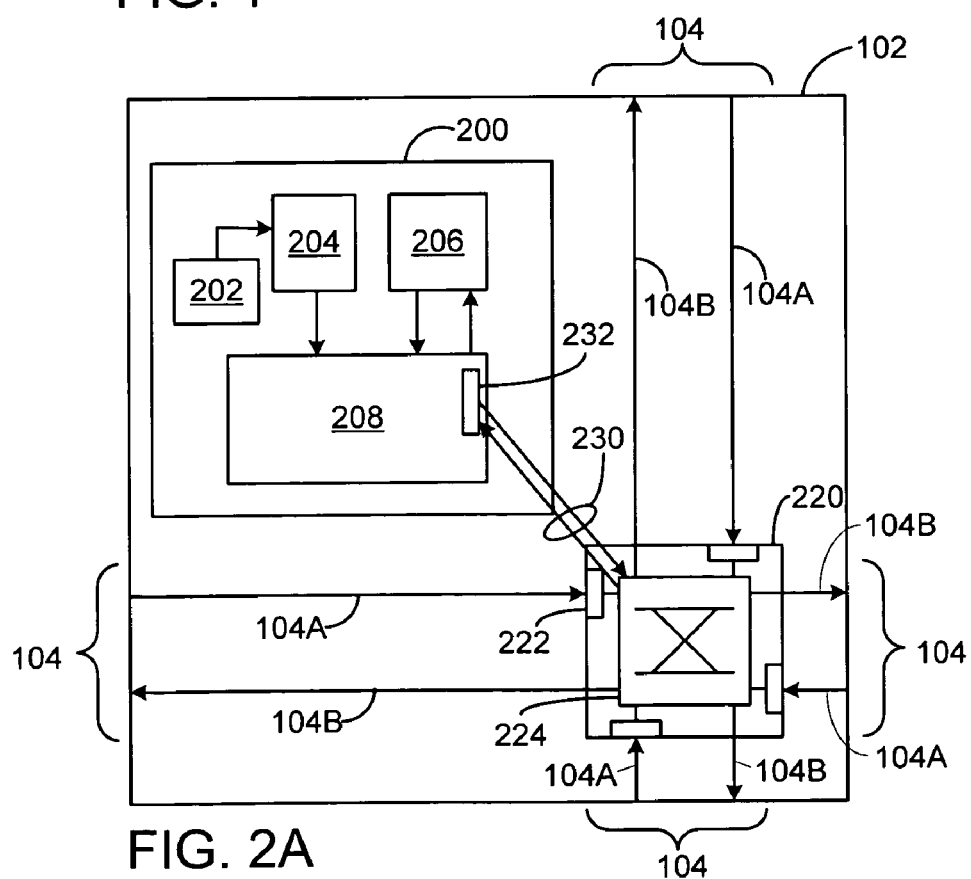
FIG. 2A is a block diagram of a tile.

Referring to FIG. 2A, a tile 102 includes a processor 200, a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. In some implementations, the instruction memory 204 and data memory 206 are both stored in portions of an on-tile memory or cache coupled to the processor 200. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit. The processor 200 can be multithreaded and/or have capabilities of a Very Long Instruction Word (VLIW) processor, a superscalar processor, or a vector processor.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

1.1 Switch Operation

Continuing to refer to FIG. 2A, a tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without necessarily disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In some implementations, the processor 200 receives a stream of compound instructions with a first instruction for execution in the pipeline 208 and a second instruction for controlling the switching circuitry 224.

The switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on the data being dynamically routed (e.g., in header information in the data). A tile can send a message to any other tile by generating the appropriate address information in the message header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast (e.g., low latency) communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Figure 2B:
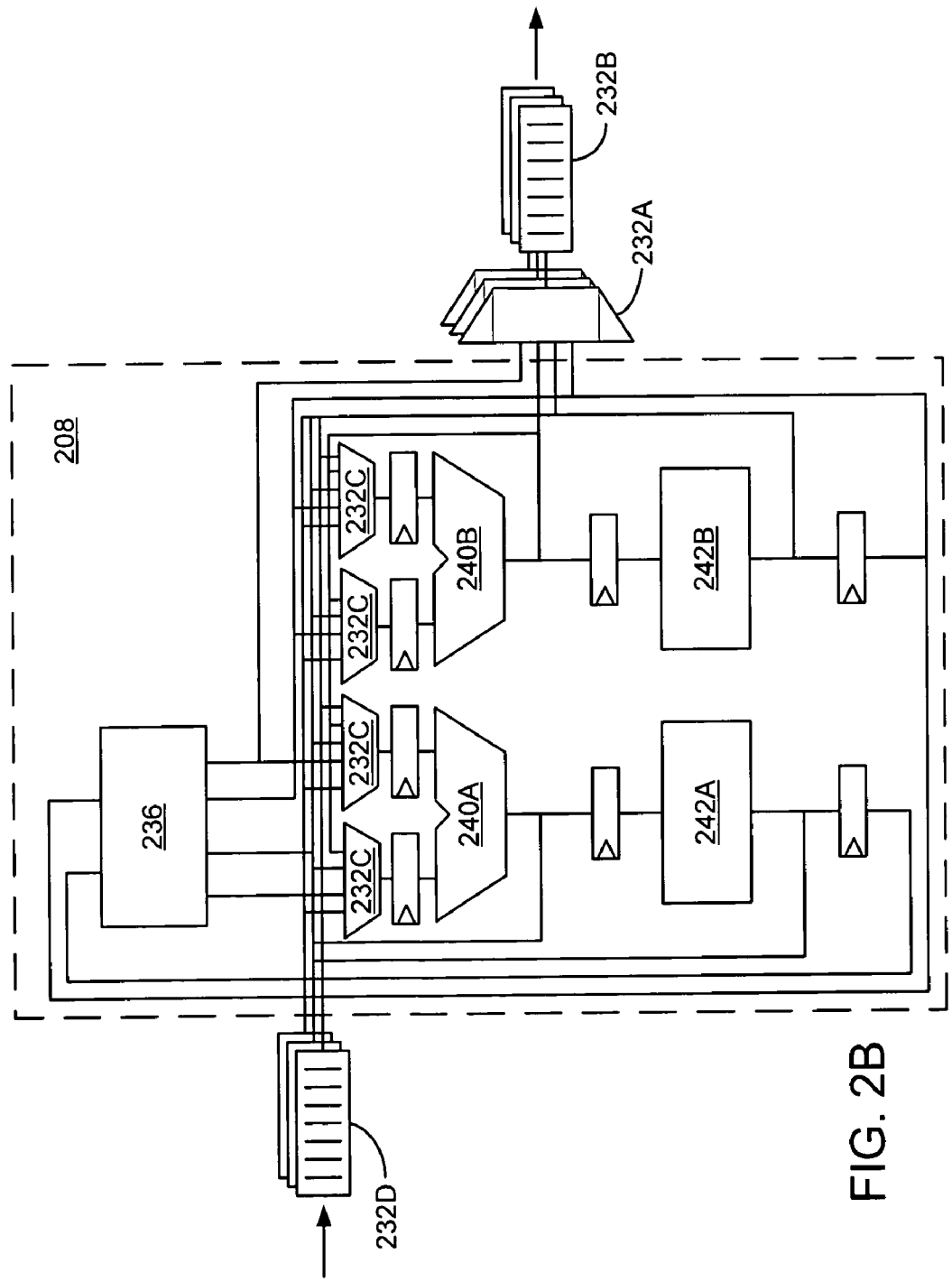
FIG. 2B is a block diagram of a pipeline integrated switch interface.

Referring to FIG. 2B, a register mapped pipeline integrated switch interface 232 (FIG. 2A) includes a set of multiplexers 232A and output buffers 232B coupled to different output ports of the static or dynamic switch. The switch interface also includes a set of multiplexers 232C that select data from a register file 236 or any of a set of input buffers 232D coupled to different input ports of the static or dynamic switch. The multiplexers 232C feed the inputs to logic units 240A and 240B. The output buffers 232B and input buffers 232D are mapped to the name space of the register file 236. When the processor 200 (FIG. 2A) reads from a register name mapped to a given switch port, data is taken from the corresponding input buffer 232D. When the processor 200 writes to a register name mapped to a given switch port, data is inserted into the corresponding output buffer 232B. The multiplexers 232A are able to select data from any pipeline stage (e.g., before or after the logic units 240A and 240B, or before or after functional units 242A and 242B) as soon as the value is available. If the processor 200 loads an instruction to read from an empty input buffer 232D or to write to a full output buffer 232B, the processor 200 will stall until it is able to proceed.

Figure 3A:
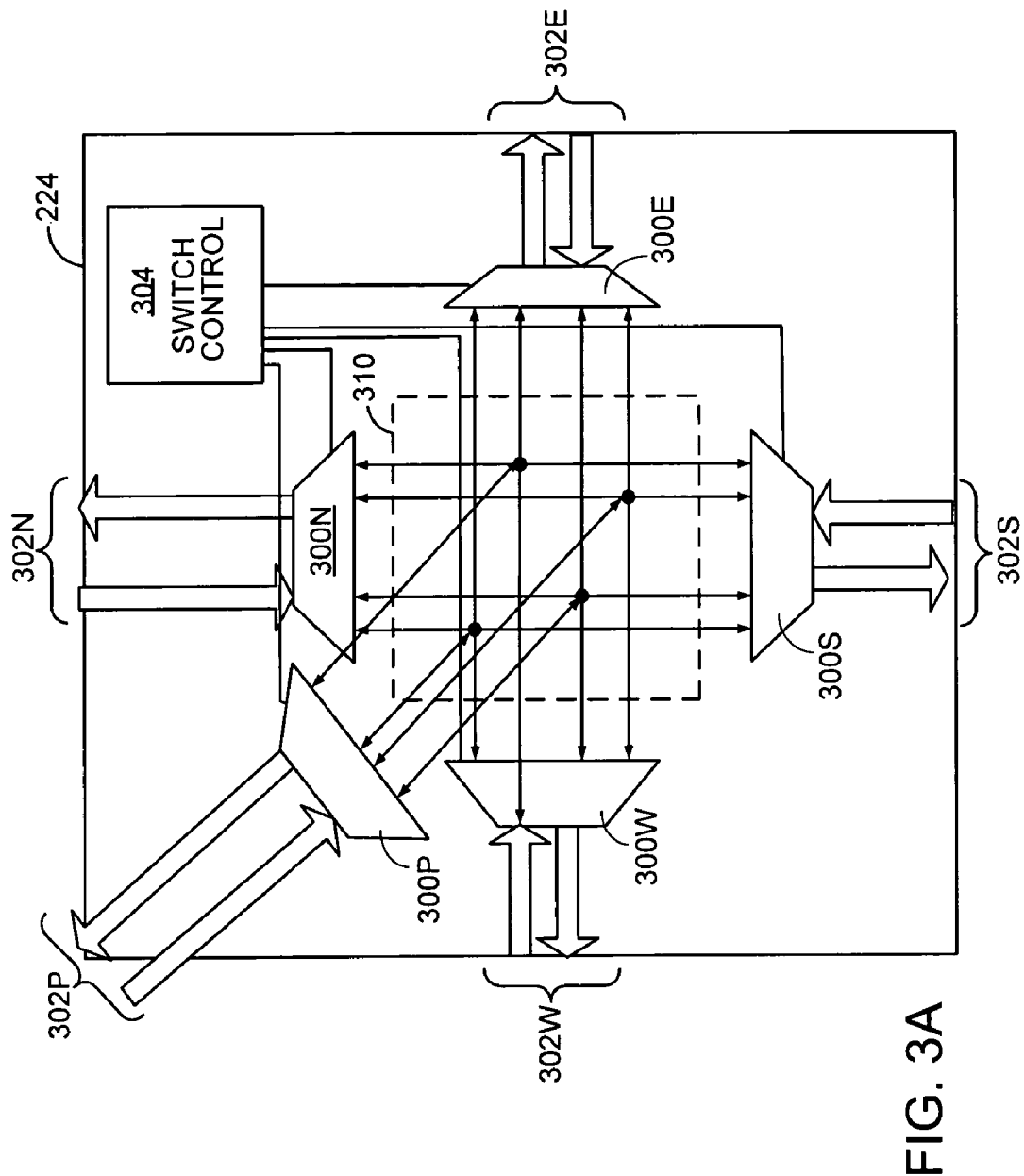
FIGS. 3A and 3B are block diagrams of switching circuitry.

Referring to FIG. 3A, switching circuitry 224 includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A switch control module 304 selects which input port and output port are connected in a given cycle. The routing performed by the switch control module 304 depends on whether the switching circuitry 224 is part of the dynamic network or static network. For the dynamic network, the switch control module 304 includes circuitry for determining which input and output ports should be connected based on header information in the incoming data.

Figure 3B:
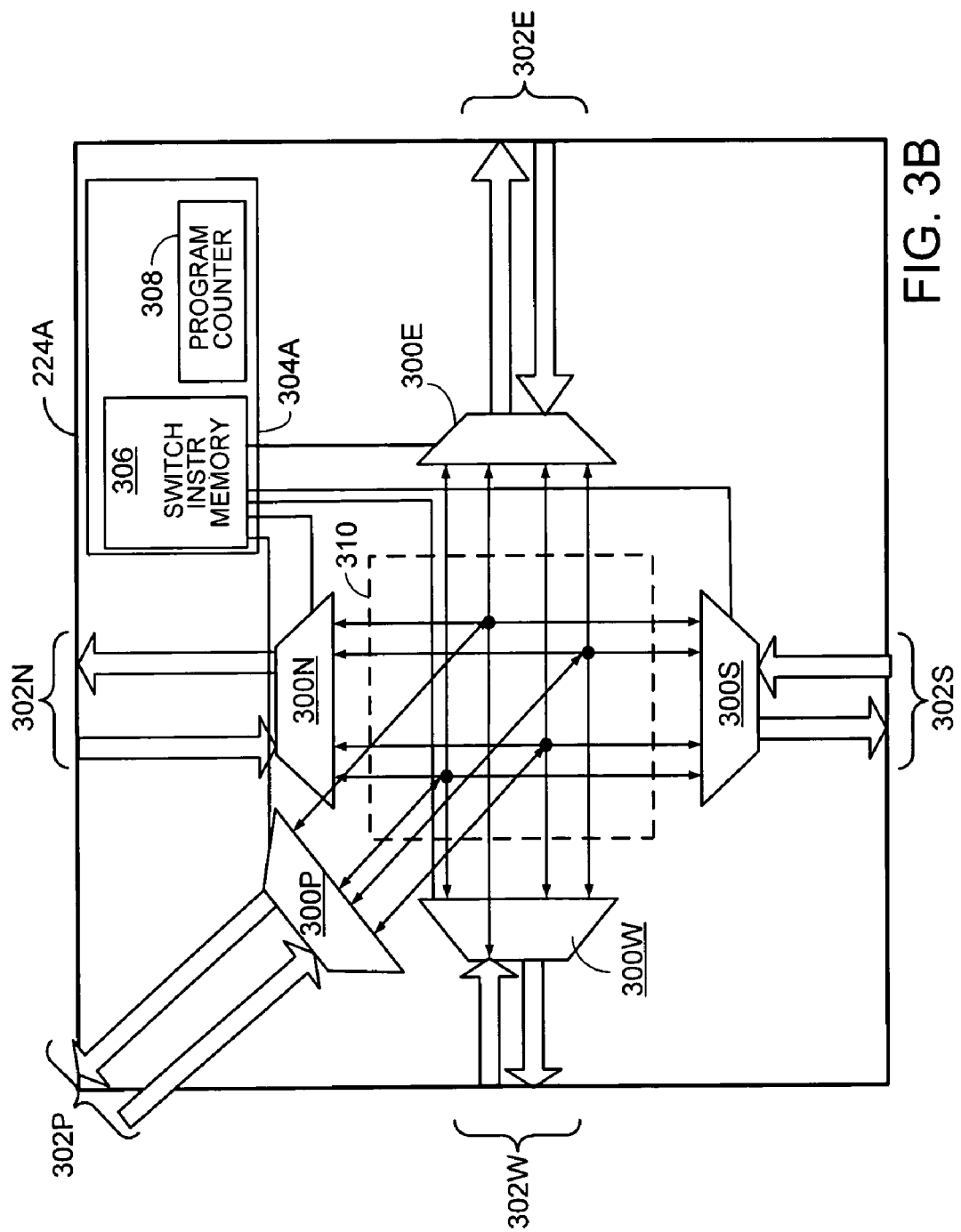

Referring to FIG. 3B, for the static network, the switch control module 304A of switching circuitry 224A operates as a switch processor and includes a switch instruction memory 306 storing switch instructions that indicate which input and output ports should be connected. A switch instruction stored in the switch instruction memory 306 includes a control flow portion, and a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the control flow portion of the switch instructions to perform actions such as branches, jumps, or no-ops based on program control flow. On a no-op, the switch control module 304A will advance to the next instruction once data routing has been completed; on jump or branch instructions, the next instruction is specified via the control flow portion of the switch instruction. The control flow portion enables the switch control module 304A to match the control flow of the processor 200. If the control flow is properly matched, the processor 200 will sync up with the switch control module 304A, allowing a program running in the tile to send and receive data as needed via the static network.

In a given clock cycle, the switch control module 304A can enable the multiplexers to move data independently onto any output port from any input port, including multicasting an input port to all output ports, as long as two input ports are not connected to the same output port in the same clock cycle.

The switch control module 304A is able to function as a switch processor with or without an ALU and registers. The switch control module 304A can include an ALU and registers to allow in-switch processing of in-flight messages. Optionally, the switch control module 304A can include other components such as a floating point arithmetic unit, or bit shifter, for example, to perform additional functions. In some examples the switch control module 304A can be a VLIW-type processor and/or can be multithreaded.

The switches 220 include hardware and software mechanisms for providing flow control to ensure that data arriving at a full tile input buffer does not overwrite old data still pending in the buffer or cause deadlock. A switch 220 can include circuitry to detect full/empty states of buffers, and some of the wires in the data paths 104 of the static or dynamic network can be dedicated to communicating flow control information. In the dynamic network, the traffic patterns are unpredictable and there is a need for techniques for deadlock avoidance or deadlock detection and recovery. For example, buffers that become full can be overflowed into memory coupled to the switch 220 or the processor 200, or over one of the networks to off-chip memory. In the static network, the traffic patterns are controlled by the processing of switch instructions in a way that ensures correct delivery of data and avoids deadlock.

In a first approach to flow control for the static network, a processor 200 or switch 220 stalls if it is executing an instruction that attempts to read data from an empty input buffer 222 or from an empty processor output buffer 236, or send data to a tile with a full input buffer 222. This approach ensures correctness in the presence of timing variations introduced by dynamic events such as dynamic memory references and I/O operations.

In a second approach to flow control for the static network, the switch 220 can continue to process subinstructions of a macro switch instruction if data has arrived at the corresponding input buffers, and delay processing subinstructions if the corresponding input buffer is empty. The switch 220 is also notified that an input buffer at a connected tile that receives data from a given output port is full (e.g., via a full/empty bit). The switch 220 is able to continue processing switch instructions for other output ports while suspending only that output port.

In one implementation of this second approach, there is a switch instruction memory 306 (e.g., separate memory units or separate queues within a single memory unit) and program counter 308 for each output port to enable the switch 220 to operate independently on a separate stream of switch instructions for respective output ports. For example, the switch 220 can extract the instruction streams for respective output ports from an incoming macro switch instruction stream that includes subinstructions for the respective output ports. The condition code from a macro switch instruction can be included with each corresponding subinstruction of the extracted instruction streams. Alternatively, each subinstruction can include its own condition code based on the appropriate program logic. This second approach allows data that can be forwarded without sacrificing correctness to be forwarded without further delay.

1.2 Additional Circuitry

In some examples, a tile can include additional circuitry embedded within or coupled to the processor 200 and/or switch 220. The configuration of the circuitry in a tile can be controlled by local control information stored in the tile. For example, a module in the tile can be turned on or off or configured into a variety of modes based on the state of a "mode indicator" (e.g., one or more bits) stored in a register or other memory store.

A tile 102 can include various types of memory modules to serve as the instruction memory 204, data memory 206, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 102 or the integrated circuit 100. Such external memory (e.g., DRAM) is accessible over high bandwidth paths of one or more dynamic networks. The amount of memory can be chosen to roughly balance the areas devoted to processing and memory, and to match the memory access time and the processor clock.

A tile 102 can include Reconfigurable Logic (RL) that takes operands from registers and writes them back to registers after performing reconfigurable logic operations. The RL can be used for bit-level (or "gate-level") logic, and also for multi-bit-level (e.g., byte-level) logic. The operations performed by the RL can be specified by logic-level instructions supplied to the RL.

Functions such as virtual address translation, caching, global shared memory and memory protection can be implemented by any combination of hardware and software (e.g., processor instructions). A tile 102 can include a translation look-aside buffer (TLB) to translate virtual addresses as they come out of the processor 200 on each tile 102. A mode bit can turn off translation. The events such as cache miss or translation fault can trigger a trap or interrupt to the processor 200, so that the processor 200 can handle it in software. For example, there can be multiple trap lines to the processor 200. Alternatively, there are few trap lines, but there is a trap vector that the processor 200 can access which encodes the type of trap that occurred. There is a mode indicator which can allow selecting whether the software or the hardware handles these events. A hardware cache tag file can export a hit/miss status to the software rather than stalling the processor pipeline.

In a processor 200 in which the switch 220 is integrated into the bypass paths of the processor pipeline 208, the translation is performed before the data is sent (or committed) to the switch (e.g., before being written into a switch buffer to be sent out on any one of the static or dynamic networks). In this way, if there is a translation fault, then the data is not sent and the instruction can be safely aborted. Otherwise, data for which there has been a translation fault could corrupt program execution if sent over a network.

2 Tiled Circuit Programming

2.1 Overview

A software system for the tiled integrated circuit 100 includes a compiler that is able to schedule instructions in both time and space by generating both processor and switch instructions for arranging the static network. The compiler can also prepare messages to be sent over the dynamic network. The combination of the static network and the pipeline integration enables the compiler to orchestrate a calculation to be performed over multiple tiles with fast register-level communication between tiles. The software system can exploit both coarse-grained parallelism and fine-grained Instruction-Level Parallelism (ILP). In addition, the software system can exploit reconfigurable logic in each tile to construct operations that are uniquely suited for a particular application. This reconfigurable logic can be coded in a hardware description language such as Verilog or VHDL, or in a high-level language such as C.

The operating system (OS) for the integrated circuit 100 can include a Linux-like kernel or a similar kernel running on a single tile 102. Alternatively, the OS can be a distributed OS running on multiple tiles sending messages to each of the processes on each of the tiles.

The compiler can leverage the architectural features of the integrated circuit 100 by partitioning and scheduling ILP or data-level parallelism across the tiles. The compiler is able to automatically parallelize sequential applications across multiple tiles 102. For example, outer loops can be parallelized at a coarse-grained while inner loops can be parallelized at a fine grain, much as in a vectorizing compiler. When the compiler can identify commonly occurring instruction patterns or bit operations, they can be configured into special operations that will run in a single cycle using the reconfigurable logic.

Figure 4:
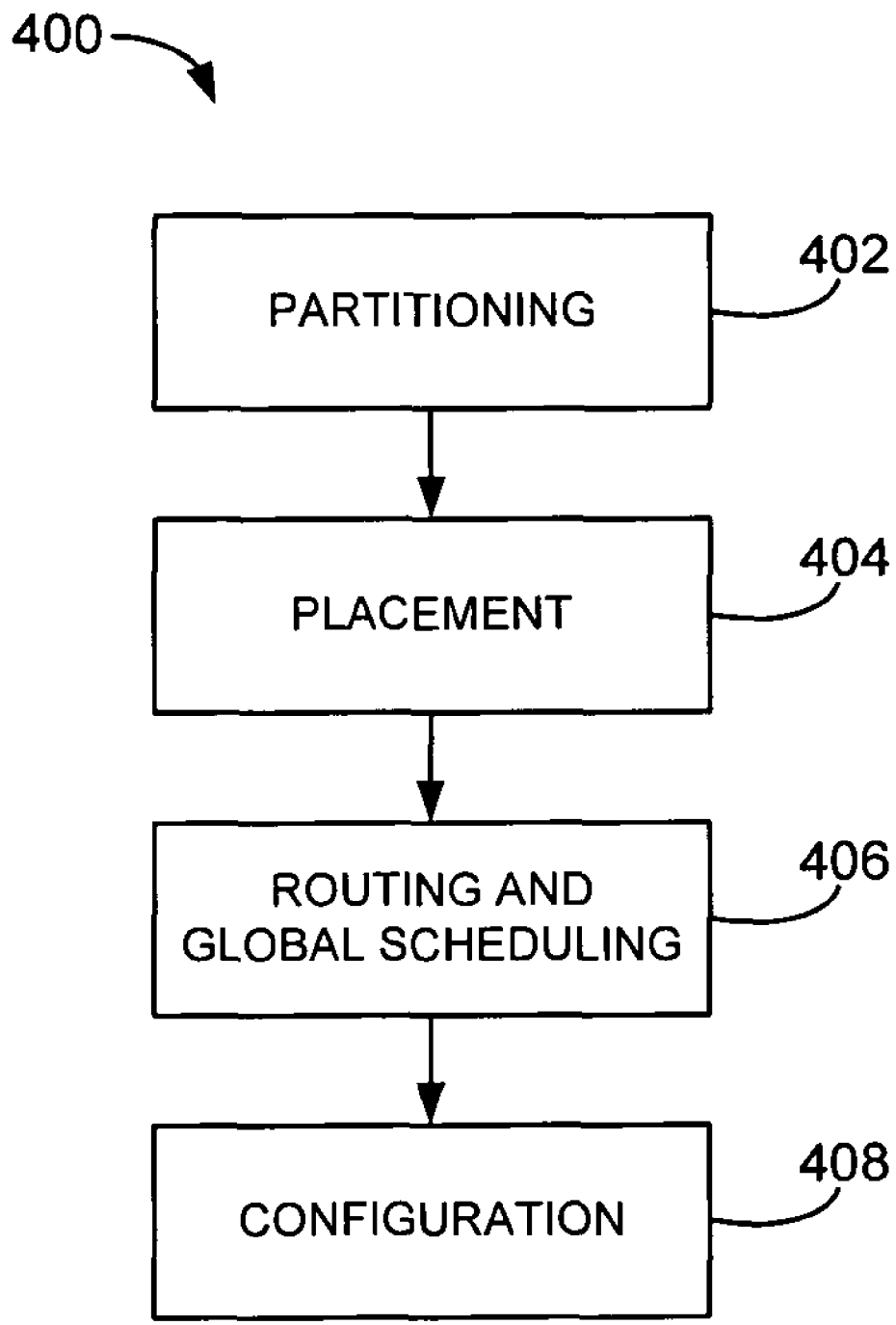
FIGS. 4 and 5 are flowcharts for compiling processes.

Referring to FIG. 4, a compiling process 400 includes a number of stages. The compiler identifies and partitions for fine grain ILP in program by balancing the benefits of parallelism versus the overheads of communication and synchronization. In a partitioning phase 402, the compiler generates parallel code for a number of threads up to the number of tiles in the integrated circuit 100. In the partitioning phase 402, the compiler assumes an idealized fully-connected switch (an "ideal crossbar"), an unbounded number of virtual registers per tile, and symbolic data references. In a placement phase 404, the compiler removes the idealization of an ideal crossbar by selecting a one-to-one mapping from threads to physical tiles. The placement algorithm attempts to minimize a latency and bandwidth cost measure and can be, e.g., a variant of a VLSI cell placement algorithm. In a routing and global scheduling phase 406, the compiler allocates physical network resources with the goal of minimizing the overall estimated completion time of the program. The compiler output includes a program (e.g., a stream of instructions) for the processor 200 of each participating tile.

In an optional configuration phase 408, the compiler selects an application-specific configuration for reconfigurable logic to perform one or more custom operation. For each custom operation, the configuration compiler generates logic-level instructions for the reconfigurable logic and if necessary rewrites associated processor or switch instructions. For example, a compound operation involving multiple instructions is replaced by a call to the appropriate custom instruction using the reconfigurable logic. The compiler output includes a program (e.g., a stream of instructions) for each tile processor 200 and switch 220, and optional logic-level instructions.

Alternatively, the compiler can generate logic-level instructions based on a separate hardware description language program.

2.2 Multi-Program Compiler Module

In some cases, an application is provided as a set of multiple programs corresponding to multiple threads of a computation. These programs can be provided as different portions of a common program source file or as separate files, and can be written in a high-level language such as C. These programs (referred to as "strands") can include communication operations that provide a form of message passing among the programs. The compiler includes a multi-program compiler module that can be used in cases in which the compiler accepts multiple programs to be mapped onto the tiled array (or onto computational resources of any type of multi-core processor that has multiple processor cores interconnected by an interconnection network such as a mesh network, a bus, or a ring). The multi-program compiler module maps each program to one or more tiles (or processor cores). The multi-program compiler module determines correspondence among communication operations in the programs, and maps communication for corresponding communication operations to resources associated with the interconnection network (e.g., a route over data paths of the network, or shared memory for storing messages sent over the network).

For example, the communication operations can include a "send" operation and a "receive" operation for communicating data words between strands. The multi-program compiler module performs static analysis to automatically generate static network message schedules. The message schedules can be used to provide from the separate strands a multi-tile program that includes appropriate instructions for each tile processor 200 and switch 220. Each strand can be compiled for a single tile, or for multiple tiles, taking advantage of ILP or data level parallelism within the strand.

2.2.1 Programming Interface

The multi-program compiler module provides an application programmer an interface for sending messages between strands. Strands can communicate with each other by sending and receiving messages using communication operations. A programmer can identify endpoints of communication operations using channel data elements (or "channels") that enable the compiler to determine correspondence among communication operations in different strands. The programming interface can be implemented in any of a variety of ways including as language primitives, or as a runtime library API.

A programmer can define a channel data element within a program specification of a strand (e.g., as a global variable at the beginning of a strand's source file).

Communication operations within function bodies of a strand program specification enable a programmer to send data words using communication resources identified by these channels.

The multi-program compiler module recognizes different types of channels. For example, two types of channels are: endpoint channels and group channels. Endpoint to channels are useful for point-to-point communication; they allow a strand to define a target strand to which words of data may be sent, or from which words of data may be received. Group channels define a set of strands that can perform a certain operation. For example, group channels can be used for broadcasts (one-to-many communication) and barriers.

In an exemplary programming interface for defining endpoint channels, there are different formats a programmer can use to define an endpoint channel. The endpoint channel definition formats include a specific reference to a target strand. In this example, each strand is mapped to a single tile according to a coordinate (x,y) in a two-dimensional array that corresponds to physical tile locations in a tiled integrated circuit. Alternatively, in other examples, a strand can potentially be mapped to multiple tiles and a different scheme can be used to identify strands. For example, identifying a target strand mapped to multiple tiles may include identifying one of the tiles that serves as a communication interface for the strand.

In a first endpoint channel definition format, the data element endpoint(x, y) in a strand's program specification defines a channel between the strand containing the definition (at an implicitly defined tile location) and the strand running on the tile at location (x, y).

Some applications stream data on and off a tiled array via external static network ports (ports at the periphery of the array for communicating over an interface to the array). The programming interface allows the programmer to provide program specifications for "port strands" that represent the expected communication patterns that will occur on the static network port at runtime (e.g., communication to or from an external entity). The programmer is able to define an expected pattern of data entering and leaving an external port by programming the port strand as if it were being run on the external side of the port. When the final compiled program is executed, even though there is no tile on the external side of the port, the communication pattern from the port strand aids the compiler in generating the appropriate processor and switch instructions for the tile. When writing a port strand, the programmer specifies the order of data values going to and from the port, but does not need to specify the values of the data entering the port from the external side since the actual data will be provided by an external source.

Two other endpoint channel definition formats allow the programmer to define channels between tile strands and port strands. The port_endpoint(x, y, dir) format defines a channel between the strand containing the definition and the port strand associated with the port in direction dir (e.g., north, east, south, or west) of the switch on the tile at location (x,y). The endpoint channel definition format rel_endpoint(x,y), defines a channel between the strand containing the definition and the strand located an offset of (x, y) from the defining strand's location. If the offset defines a location off the edge of the tile array, the channel is declared as associated with the switch port of the tile adjacent to that external location.

Group channels are defined by declaring an individual strand as a member of some group. The group_member ("name") definition provides a mechanism for declaring group membership. The group "name" is defined as the set of all strands that contain a group_member("name") definition. A group may include any number of strands and/or port strands.

A programmer can use a variable whose value is an endpoint or group channel as an argument to various types of communication operations. Point-to-point communication can be programmed using the send(value, endpoint, "label") operation for sending a data value of value to a strand defined by endpoint, and using the receive(endpoint, "label") operation for receiving a value from a strand defined by endpoint. The multi-program compiler module uses static analysis techniques (e.g., control flow analysis) to match pairs of send and receive operations in different strands. The compiler uses the correspondence between the send and receive operations to derive a message schedule for generating switch instructions. This matching can also be used, for example, in deadlock avoidance techniques.

Group channels can be used, for example, for broadcasts and barriers. The broad_send(value, group, "label") operation and the broad_receive(group, "label") operation can be used to perform broadcast operations. The group called group specified in the operation is the set of all strands involved in the broadcast; i.e., the sending strand plus all receiving strands. The barrier(group, "label") operation provides a synchronization primitive; all strands in group will wait in response to the barrier operation until every member of group has arrived at the barrier operation in the respective program control flow.

The multi-program compiler module also provides a naming mechanism that can be used to verify that a derived message schedule match a communication pattern expected by the programmer. Each communication operation (e.g., send, receive, broad_send, broad_receive, barrier) can include an optional string argument (e.g., "label" used above) that names the value being transmitted. This string provides a form of type-checking. After the multi-program compiler module uses control flow analysis to match pairs of send/receive operations (including pairs of broadcast send/receive operations), the module can check that each name associated with a value in a send operation matches that specified by the corresponding receive operation. Any names that don't match can be used to indicate an inconsistency between the programmer's expectations and the compiler's analysis. For example, this naming mechanism is useful for avoiding message ordering errors; if tile 0 sends ("a", "b") but tile 1 receives ("b", "a"), a warning can be generated.

2.2.2 Strand Analysis

The multi-program compiler module analyzes the strands to determine the ordering of communication operations between strands. In some implementations, a high level compiler module compiles the high-level source code for the strands, in a first phase (e.g., as shown in FIG. 4), into binary object files for each tile (e.g., one strand per tile, or one strand compiled for multiple tiles based on ILP). The multi-program compiler module then analyzes the binary object files in a second phase to modify the processor instructions and generate communication information (e.g., in the form of switch instructions). In some implementations, the multi-program compiler module performs the analysis on the high-level strands directly, and generates the appropriate binary object files for the tiles and the communication information.

In the implementations in which the multi-program compiler module analyzes the binary object files, the compiler module can convert the object files into a structured form that represents the control flow elements such as loops, if/else statements, and compound conditionals. These control flow elements may be nested, forming a control flow hierarchy. The compiler module takes each strand's binary file(s) and extracts the control flow hierarchy that was originally in the high-level source for that strand. After each strand's control flow hierarchy has been reconstructed, the compiler module merges the information into a unified global schedule and generates the appropriate communication information (e.g., switch instructions).

One process for reconstructing the control flow hierarchy includes performing a number of graph transformations on control flow graphs. For example, the compiler module extracts basic blocks from a strand's binary object file(s). Then, a control flow graph is constructed from the basic blocks and subroutines are identified. Each function is then processed to eliminate infinite loops and clarify control relationships, and finally a "program structure tree" (PST) and "message structure tree" (MST) are created for each function in each strand.

A basic block is sequence of instructions without jump or branch instructions, and corresponds to a vertex in a program control flow graph. For example, a sequence of instructions forms a basic block if, under any possible program execution order, the instructions in the basic block execute in the sequence order with no other instruction executing between two instructions in the sequence. From one basic block, one or more subsequent basic blocks can be determined based on branch target addresses associated with branch instructions.

The MST and PST describe each function in an object file as a hierarchy of single-entry, single-exit regions. Each region has an associated control flow type, for example, loops and if/else blocks. When nested within each other, these control flow region form a tree. The PST is a basic representation of this control flow hierarchy which shows how the regions are nested within each other. The MST, derived from the PST, includes information on the order in which regions are executed and what messaging operations and function calls occur within each region.

Figure 5:
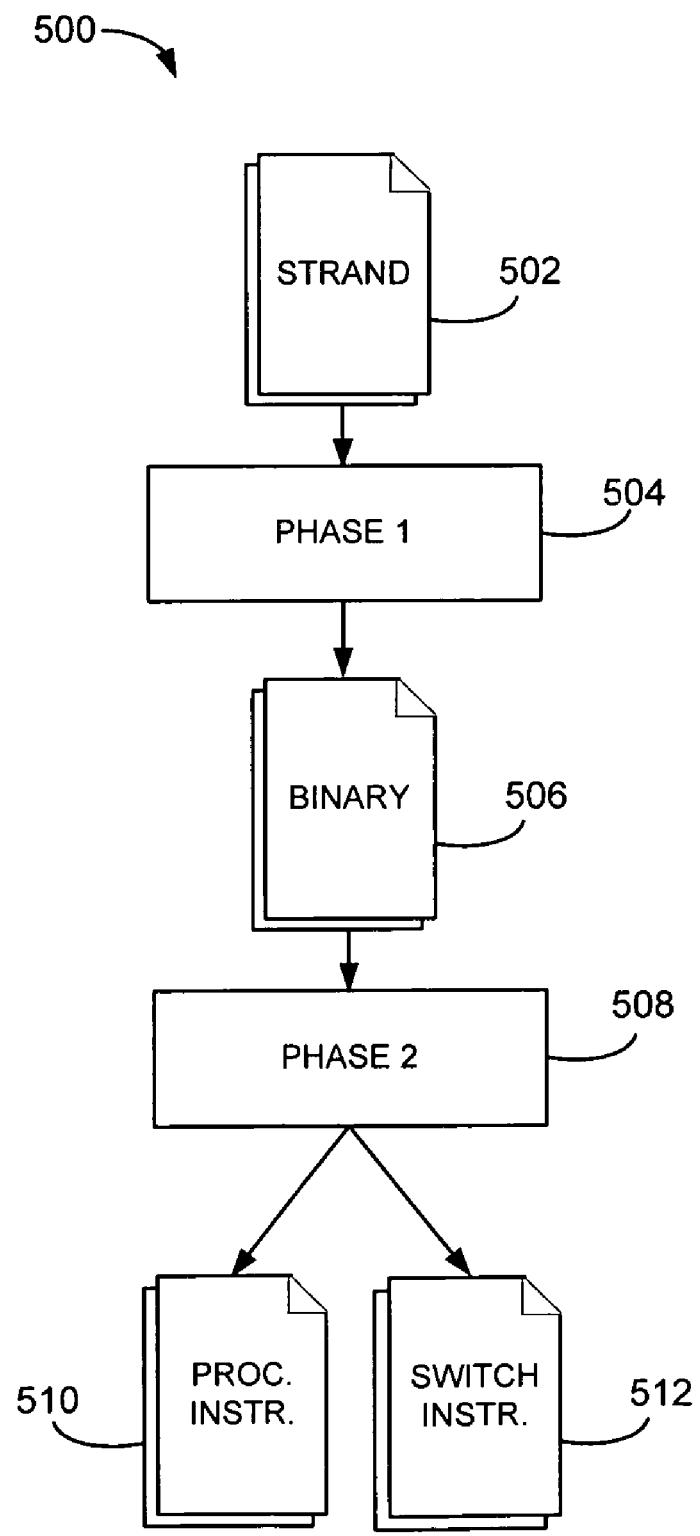

FIG. 5 shows an exemplary compiling process 500 including a first phase 504 in which strands are initially compiled into a binary form that includes annotations, and a second phase 508 in which the binary code and annotations are analyzed to generate the output files. In some implementations, the analysis can be performed in fewer phases (i.e., one phase) or in more phases. The second phase can include static analysis (performed before runtime), or in some implementations, the multi-program module can perform some of the analysis at runtime, e.g., in a system that uses dynamic compilation.

In the first phase 504, a high-level compiler module compiles (e.g., using gcc) a set of strands 502 (e.g., a set of C source files) to generate a corresponding set of binary files 506 including tile processor instructions and annotations specifying routing information based on communication operations in the strands 502. For example, the annotations can be generated by the C preprocessor based on macros in a header file.

In the second phase 508, the multi-program compiler module uses basic-block analysis to extract control flow and routing information for each strand containing communication operations. In order to schedule a message between two tiles, the compiler module analyses the control flow to ensure that the receiving tile will be able to receive data sent by the sending tile. Thus, the compiler module can avoid deadlock due to unreceived data words blocking the static network. In the second phase 508, the compiler module generates output files for each tile mapped to a strand. A set of binary processor instruction files 510 for the respective tiles include any changes made by the compiler module. A set of switch instruction files 512 for the respective tiles specifies switch instructions that have the appropriate control flow information corresponding to the processor instruction files 510. In some implementations the switch instruction files 512 include binary switch instructions. Alternatively, the switch instruction files 512 can be assembly code, which can then be compiled into a binary form that can be run on the switches of the tiles. Another compilation phase can be run to assemble the processor instruction files 510 and the binary version of the switch instruction files 512 into a single parallel program that can be booted onto a tiled integrated circuit.

In some implementations the compiler module does not generate a set of switch instruction files 512, but instead schedules communication using dynamic messages by modifying the processor instruction files 510 to provide the appropriate dynamic message headers. In some implementations the compiler module provides a combination of static and dynamic communication scheduling.

Control flow analysis to match send and receive operations involves matching the control flow relationships among basis blocks on the sending and receiving tiles. For example, if the matching send and receive operations in the strands for the respective tiles are each embedded within a loop, the compiler module determines whether the loops have the same number of loop iterations, and whether the send and receive operations occur at the same nesting level of a nested loop. The control flow does not necessarily need to be exactly the same for the respective strands—control flow can differ between the strands as long as the matched pairs of send and received operations have the same control flow nesting.

Matching send and receive operations can help to prevent errors due to deadlock. Different techniques can be used to handle potential deadlock. On static networks, the compiler module can generate switch instructions that avoid deadlock. On dynamic networks, the compiler module can prepare a schedule of dynamic messages to be sent according to the send and receive operations that avoids deadlock. Alternatively, on dynamic networks, the compiler module can prepare a schedule of dynamic messages to be sent without necessarily ensuring that the schedule avoids deadlock, and rely on deadlock recovery techniques to detect and recover from a deadlock.

After matching send and receive operations, the compiler module generates the schedule of switch instructions for the switch instruction files 512. The compiler module generates the control flow portion of the switch instruction from the control flow of the corresponding strand. For example, if data words are being sent between two tiles in a loop, the compiler module determines a route between the two tiles and copies the loop control flow into the corresponding switch instruction files 512 to be run on the sending and receiving tiles' switches, as well as any switches along the determined route. The routing portions of the switch instructions correspond to the determined route.

Various features of the tiled integrated circuit architecture and programming described herein can be implemented by modifying versions of the tiled integrated circuits described in U.S. application Ser. No. 11/302,956, incorporated herein by reference, or in the following publications: "Baring It All to Software: RAW Machines" *IEEE Computer*, September 1997, pp. 86-93, "Space-Time Scheduling of Instruction-Level Parallelism on a Raw Machine," *Proceedings of the Eighth International Conference on Architectural Support for Programming Languages and Operating Systems (ASPLOS-VIII)*, San Jose, Calif., Oct. 4-7, 1998, "Raw Computation" Scientific American, August 1999, Vol. 281, No. 2, pp. 44-47, "The Raw Microprocessor: A Computational Fabric for Software Circuits and General Purpose Programs," *IEEE Micro*, March/April 2002, pp. 25-35, and "A 16-issue multiple-program-counter microprocessor with point-to-point scalar operand network," *Proceedings of the IEEE International Solid-State Circuits Conference*, February 2003, each of which is incorporated herein by reference.

Various techniques described herein describe a tiled integrated circuit architecture in which multiple processor cores are interconnected by a network of switches connected to respective computation units. Some of the techniques can be implemented in additional types of integrated circuit architectures. For example, some techniques can be used in an integrated circuit in which multiple processor cores include respective computation units interconnected by a shared interconnection network such as a bus, or a pipelined bus.

It is to be understood that the foregoing description is intended to illustrate and not to limit the scope of the invention, which is defined by the scope of the appended claims. Other embodiments are within the scope of the following claims.

What is claimed is:

1. A computer-implemented method for generating instructions to be executed in an integrated circuit, the integrated circuit comprising a plurality of processor cores interconnected by an interconnection network, the method comprising:
   accepting a plurality of programs, at least some of the programs including one or more communication operations to communicate with other programs;
   mapping each program to one or more of the processor cores;
   determining correspondence among communication operations in the programs; and
   mapping communication for corresponding communication operations to resources associated with the interconnection network.

2. The method of claim 1, wherein determining correspondence among communication operations in the programs comprises matching pairs of send and receive operations within the programs.

3. The method of claim 2, wherein matching pairs of send and receive operations within the programs comprises determining whether a pair of send and receive operations are included in portions of the programs that have corresponding control flow.

4. The method of claim 3, wherein determining whether a pair of send and receive operations are included in portions of the programs that have corresponding control flow comprises determining a number of loop iterations in the portions of the programs.

5. The method of claim 3, wherein determining whether a pair of send and receive operations are included in portions of the programs that have corresponding control flow comprises determining a loop nesting level of the operations in the portions of the programs.

6. The method of claim 2, wherein mapping communication for corresponding communication operations to resources associated with the interconnection network comprises mapping communication between at least one pair of programs that include matching send and receive operations to a route through the network between processor cores mapped to the respective programs.

7. The method of claim 6, wherein mapping the communication to the route comprises generating sequences of switch instructions specifying connections between input and output ports of switches in processor cores along the route.

8. The method of claim 7, each switch instruction comprises a control flow portion and a routing portion.

9. The method of claim 8, wherein the control flow portion of each switch instruction is based on control flow for computations performed in the pair of programs.

10. The method of claim 8, wherein the routing portion of each switch instruction specifies input ports to be connected to at least some of the output ports.

11. The method of claim 8, wherein the control flow portion comprises a branch instruction, a jump instruction, or a no-op instruction.

12. The method of claim 6, wherein mapping the communication to the route comprises generating destination information for message data associated with the matching send and receive operations, whereby switches in processor cores are able to use the destination information to direct the message along the route.

13. The method of claim 2, wherein mapping communication for corresponding communication operations to resources associated with the interconnection network comprises providing shared memory accessible to at least one pair of programs that include matching send and receive operations for storing message data associated with the send and receive operations.

14. The method of claim 2, wherein each send operation specifies data to be sent and a receiver endpoint, and each receive operation specifies a sender endpoint.

15. The method of claim 14, wherein the receiver endpoint or sender endpoint identifies a processor core.

16. The method of claim 14, wherein the receiver endpoint or sender endpoint identifies a port of the switch in the identified processor core that provides an interface external to the plurality of processor cores.

17. The method of claim 1, further comprising revising each program to perform a specified computation on the mapped one or more processor cores using the mapped resources.

18. The method of claim 1, further comprising mapping at least one of the programs to multiple processor cores.

19. The method of claim 18, further comprising compiling the mapped program to run in parallel on the multiple processor cores.

20. The method of claim 19, wherein compiling the mapped program comprises compiling the mapped program to run in the multiple processor cores based on instruction level parallelism.

21. The method of claim 1, wherein each program is written in a high-level programming language.

22. The method of claim 21, wherein each program comprises code generated by compiling source code written in the high-level programming language.

23. The method of claim 21, wherein the high-level programming language uses C programming language syntax.

24. A tangible computer-readable medium storing a computer program for generating instructions to be executed in an integrated circuit comprising a plurality of processor cores interconnected by an interconnection network, the computer program comprising instructions for causing a computer system to:

accept a plurality of programs, at least some of the programs including one or more communication operations to communicate with other programs;

map each program to one or more of the processor cores;

determine correspondence among communication operations in the programs; and map communication for corresponding communication operations to resources associated with the interconnection network.

25. The tangible computer-readable medium of claim 24, wherein determining correspondence among communication operations in the programs comprises matching pairs of send and receive operations within the programs.

26. The tangible computer-readable medium of claim 25, wherein matching pairs of send and receive operations within the programs comprises determining whether a pair of send and receive operations are included in portions of the programs that have corresponding control flow.

27. The tangible computer-readable medium of claim 25, wherein mapping communication for corresponding communication operations to resources associated with the interconnection network comprises mapping communication between at least one pair of programs that include matching send and receive operations to a route through the network between processor cores mapped to the respective programs.

* * * * *